US012601214B2

(12) United States Patent
Jean et al.

(10) Patent No.: US 12,601,214 B2
(45) Date of Patent: Apr. 14, 2026

(54) COUPLING DEVICE WITH INTEGRATED CLEARANCE COMPENSATION

(71) Applicant: ADVANCED COMFORT SYSTEMS SAS—ACS FRANCE, Bressuire (FR)

(72) Inventors: Anthony Jean, Haute-Goulaine (FR); Maxime Nee, Bressuire (FR)

(73) Assignee: ADVANCED COMFORT SYSTEMS SAS—ACS FRANCE, Bressuire (FR)

( * ) Notice: Subject to any disclaimer, the term of this patent is extended or adjusted under 35 U.S.C. 154(b) by 0 days.

(21) Appl. No.: 18/998,524

(22) PCT Filed: Jul. 27, 2023

(86) PCT No.: PCT/EP2023/070909
§ 371 (c)(1),
(2) Date: Jan. 27, 2025

(87) PCT Pub. No.: WO2024/023255
PCT Pub. Date: Feb. 1, 2024

(65) Prior Publication Data
US 2026/0009277 A1 Jan. 8, 2026

(30) Foreign Application Priority Data
Jul. 27, 2022 (EP) .................................... 22187332

(51) Int. Cl.
*E05F 15/662* (2015.01)
*E05F 15/638* (2015.01)
*E05F 15/646* (2015.01)

(52) U.S. Cl.
CPC .......... *E05F 15/662* (2015.01); *E05F 15/638* (2015.01); *E05F 15/646* (2015.01); *E05Y 2201/11* (2013.01); *E05Y 2201/662* (2013.01); *E05Y 2201/684* (2013.01); *E05Y 2600/10* (2013.01);
(Continued)

(58) Field of Classification Search
None
See application file for complete search history.

(56) References Cited

U.S. PATENT DOCUMENTS 4,920,698 A 5/1990 Friese et al.
7,451,956 B2 * 11/2008 Bohlen .................. E06B 9/323 248/265
(Continued)

FOREIGN PATENT DOCUMENTS

DE 102016005390 A1 * 11/2017 ............ E05F 15/668
EP 0 857 844 B1 12/2002
(Continued)

*Primary Examiner* — Catherine A Kelly
(74) *Attorney, Agent, or Firm* — S.J. INTELLECTUAL PROPERTY LTD.

(57) ABSTRACT

A device for closing (1) a bay arranged in a structure comprises a support (7) intended to receive a drive device (8) and to be fixed to said structure. The support (7) comprises a plate (10), intended to be fixed to said structure and receive said drive device (8) and a cover (12), receiving a coupling portion (60) of a transmission means (6) towards the bay. The support (7) is capable of assuming at least one free state, wherein the cover (12) and the plate (10) are free in translation in relation to one another; and a locked state, in which the cover (12) and the plate (10) are immobile in relation to one another.

17 Claims, 8 Drawing Sheets

Figure 1:
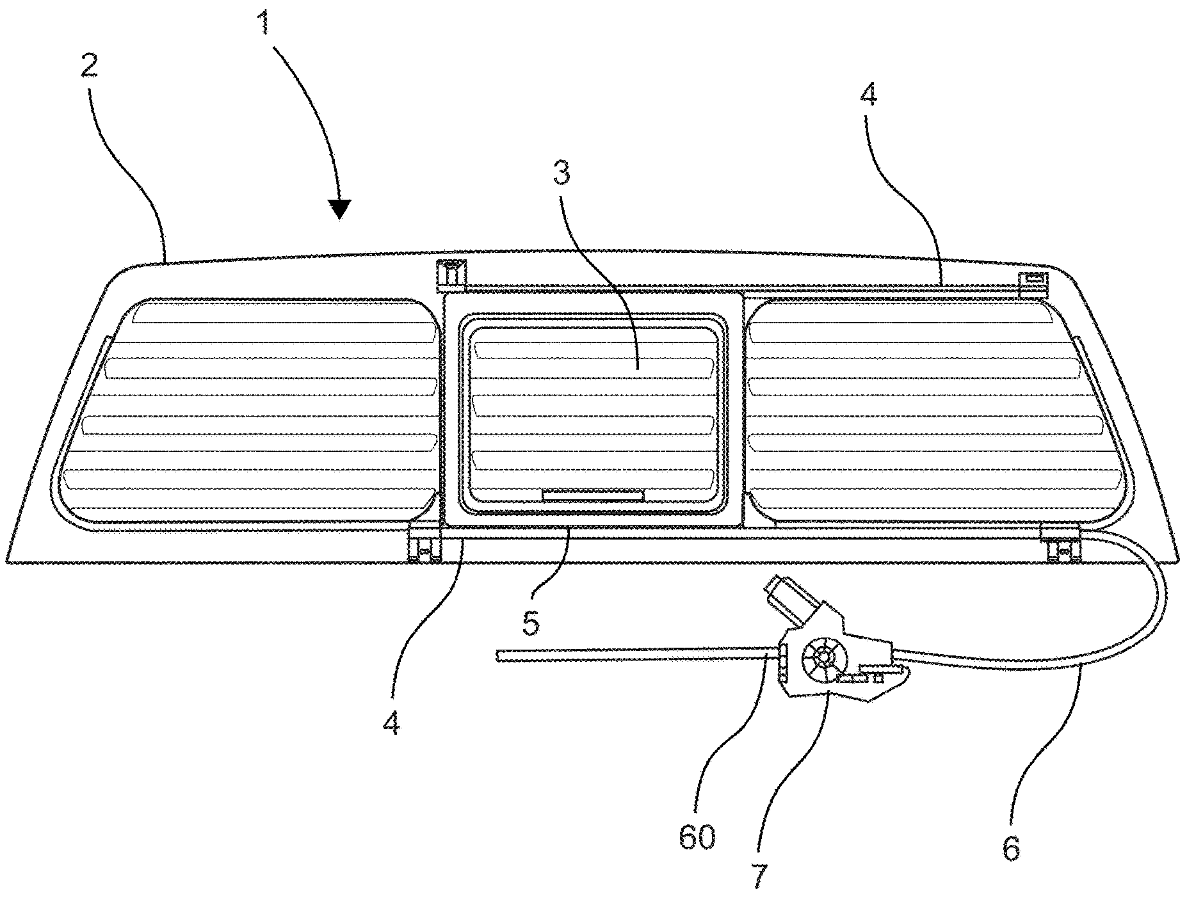

(52) U.S. Cl.
CPC ... *E05Y 2600/626* (2013.01); *E05Y 2600/632* (2013.01); *E05Y 2900/55* (2013.01)

(56) References Cited

U.S. PATENT DOCUMENTS

| | | | | |
|---|---|---|---|---|
| 7,556,577 | B2 * | 7/2009 | Kita | E05F 15/646 474/135 |
| 7,575,270 | B2 * | 8/2009 | Nagai | E05B 83/40 49/281 |
| 7,774,985 | B2 * | 8/2010 | Miyagawa | H02K 7/116 49/360 |
| 8,562,063 | B2 * | 10/2013 | Giret | E05D 15/1047 296/146.15 |
| 8,857,104 | B2 * | 10/2014 | Ishigaki | E05F 15/646 49/360 |
| 8,910,767 | B2 * | 12/2014 | Kita | H02K 7/1085 192/84.961 |
| 8,919,043 | B2 * | 12/2014 | Jincheleau | E05F 11/535 49/404 |
| 9,388,618 | B2 * | 7/2016 | Hoffman | E05F 3/04 |
| 9,518,420 | B2 * | 12/2016 | Kondo | E05F 15/643 |
| 10,774,572 | B2 | 9/2020 | Urano | |
| 11,691,852 | B2 * | 7/2023 | Kashiwakura | B66B 13/06 187/315 |
| 11,746,582 | B2 * | 9/2023 | Snider | E05F 11/535 49/360 |
| 12,366,102 | B2 * | 7/2025 | Finke | E05F 15/643 |
| 2023/0374835 | A1 * | 11/2023 | Jean | B60J 1/16 |
| 2025/0092731 | A1 * | 3/2025 | Charge | E05F 11/535 |
| 2025/0163741 | A1 * | 5/2025 | Nee | B60J 1/16 |
| 2025/0214398 | A1 * | 7/2025 | Giret | B60J 1/085 |

FOREIGN PATENT DOCUMENTS

| | | | | |
|---|---|---|---|---|
| EP | 0 778 168 B2 | | 2/2007 | |
| EP | 3034751 A1 | * | 6/2016 | E05F 3/227 |

* cited by examiner

COUPLING DEVICE WITH INTEGRATED CLEARANCE COMPENSATION

1. FIELD OF THE INVENTION

The field of the invention is that of bay equipment, used particularly in motor vehicles.

More precisely, the invention relates to devices for closing off a bay arranged in a structural element, for example the body of a vehicle or a door of the vehicle, and comprising a sliding movable part likely to free or close an opening while offering a flush appearance, when viewed from the outside.

In particular, the invention can equip different types of structures, such as cars, campervans, coaches and buses, minibuses, trucks, vans, boats, caravans, etc.

Such devices, developed for several years by the holder of the present application, are particularly known as "flush bay".

In other words, these devices are designed so as to have, when viewed from the outside, a flush or almost-flush appearance between the body, or more generally the wall or the structure, and the fixed part of the device.

2. PRIOR ART

The general principle of this technique is particularly described in the patent documents EP-0 778 168 and EP-0 857 844.

The closure device (hereinafter called "flush bay") comprises a fixed part and a part movable in relation to this fixed part, or sliding panel.

The movable part is connected to the fixed part by functional elements that ensure the required mobility and that are attached onto the face of the fixed part directed towards the inside of the vehicle.

These functional elements, or rails, ensure a function of guiding and holding the movable panel. They are placed on the face oriented towards the inside of the vehicle, away enough from the edges, or from the periphery, of the fixed part so that this periphery can be secured directly to the edges of the bay, without the rails interfering. Thus, it is possible to dispense with the presence of a connecting frame between the edges of the bay and the fixed part.

This fixed part may be made of one or more element(s) (placed next to one another in the same plane), for example made of glass or polycarbonate.

Thus, such a flush bay can be entirely mounted independently of the vehicle, and attached, from the outside, in the housing defined to this end by the bay, or the housing defined in the body, or more generally in the wall.

The edges of the fixed part are secured, for example using an adhesive bead, to the edges of the bay, without any other intermediate connecting element.

In aesthetic terms, the flush bay has a smooth, flush appearance, when viewed from the outside, due to the fact that no frame is necessary on the contour of the opening formed in the fixed assembly.

To ensure the movement of the movable part, generally consisting of a transparent panel, a guide device is therefore provided including a first and a second guide rail fixedly mounted on the fixed part (or fixed structure) of the bay, on either side of the opening closed by the movable panel.

The movable panel is mounted, by means of shuttles, on the rails, to slide for example in a longitudinal direction, in a sliding plane between one (or more) opening position(s) and a closed position, wherein it closes off the opening.

The movable panel is moved, depending on the implementations, manually or using motorisation. In the latter case, the motor, typically an electric motor, is generally distant from the flush bay. More precisely, the motor is mounted on the structure of the vehicle (on a part of the chassis or in the casing of a door, for example) and connected to the movable panel by means of transmission means, in order to control the movement of the movable panel between a closed position and one or more open positions. The transmission means is elongated, whereby the motor can be mounted offset in relation to the flush bay. In particular, the transmission means may be in the form of a serrated cable (so-called push-pull cable), generally housed in a sheath, connected to the electric motor of the power unit so as to pull or push the movable panel. The transmission means may also be in the form of a belt, for example.

The motor is thus separated and distant from the closure device of the bay, and connected to the latter by means of the transmission means. It is received on a support secured to the structure (for example body or door) of the vehicle. Thus, the "flush bay" system (including the support and the transmission means) can be constructed and supplied by a first actor, and then assembled and mounted in the vehicle by the manufacturer of said vehicle, who fixes the closure device to the edges of the bay and fixes the support and the motor it receives to the structure.

However, mounting the motor on the support is not without problems. Indeed, this mounting may be disturbed by a certain number of clearances arising particularly from the relative position between the support and the rest of the closure device. If these clearances are not taken up, they cause overstresses within the closure device, impairing the proper operation thereof or even deteriorating it.

Indeed, to ensure proper operation (opening and closing of the movable panel, in particular good transmission of the forces from the drive device to the shuttle), the support must be located at a sufficiently precise position in relation to the rest of the closure device to ensure good transmission of the forces coming from the drive device. If this distance is not respected, the transmission means may lack tension, or on the contrary be too tight, which impairs the transmission of forces by the actuating device (i.e. the motor). For example, in the case of a transmission means comprising a cable housed in a rigid sheath, this relatively precise position results in particular from the dimensions of the relatively rigid sheath wherein the cable runs.

However, the precise adjustment of this position, because the closure device is fixed to the structure both via the fixed part (at the bay) and, for the motor thereof, via the support, on a predetermined location of the raw structure of the vehicle, or "body in white" (BIW) according to the usual terminology. This predetermined location on the structure is subject to a certain tolerancing on which the manufacturer of the closure device has no control. Furthermore, the bonding of the lower rail (on which the movable part of the closure device is mounted in translation) also generates a certain amount of clearance. Finally, in the case of a cable-type transmission means in a rigid sheath, the sheath may also have a certain clearance.

Thus, the relative position between the support and the rest of the closure device is not a datum that can be controlled by the manufacturer of the closure device, and tolerancing on this relative position generates a certain clearance that can be detrimental to the transmission mechanism of the drive device (e.g. the motor) to the movable part of the closure device. This is especially the case since in practice, the overall clearance can exceed one centimetre in extreme cases.

The manufacturer is therefore led to modify the position, adjust or move the support on the structure, or force on the rigid sheath. The first approach is complex, and sometimes detrimental to good securing over the long-term. The second impairs the proper operation of the closure device.

Furthermore, this adjustment is generally difficult and requires the use of specific tooling.

There is therefore a need to compensate for this clearance in a simpler way and if possible integrated into the coupling device.

The invention improves the situation.

3. SUMMARY OF THE INVENTION

The technique of the invention makes it possible to solve at least some of the drawbacks raised by the prior art. More precisely, the proposed technique relates to a device for closing a bay arranged in a structure, the closure device comprising a fixed part, wherein an opening is defined, and at least one movable sliding panel guided along two guide rails mounted on one face of said fixed part, between a closed position, closing said opening, and at least one open position, at least one of said guide rails guiding in translation a shuttle ensuring the passage of the movable panel from said closing position to said at least one open position, and vice versa, said shuttle being connected to a drive device offset in relation to said shuttle and connected to the shuttle by means of a transmission means.

According to the invention, the closure device comprises a support intended to receive said drive device, the support being intended to be fixed to said structure and comprising two parts:

- a first part, called a plate, intended to be fixed to the said structure and to receive the said drive device, and
- a second part, called a cover, receiving a first so-called coupling portion of said transmission means, the cover being mounted on the plate so that the support is capable of assuming at least two states:

- a free state, in which the cover and the plate are free in translation in relation to one another;
- a locked state, in which the cover and the plate are immobile in relation to one another.

Thus, the cover and the plate are adjustable in translation in relation to one another in the free state, and fixed in the locked state.

The free state makes it possible to adjust the relative position of the drive device (received by the plate) in relation to the transmission means (received by the cover), hereinafter referred to as cover/plate translation. The cover/plate translation allowed in this way makes it possible to compensate for any clearance in the adjustment direction, whether induced by the structure or by the drive device (e.g. a motor). This compensation of the clearance makes it possible to maintain the transmission means at the nominal length thereof, whereby the prestresses within the mechanism are limited. For example, in the case of a transmission means in the form of a belt, the latter can thus be tensioned thanks to the adjustment offered by the support. As a variant, the transmission means may be a cable, and the compensation of the clearance makes it possible to keep this cable under tension.

The locked state for its part makes it possible to fix the plate and the cover, whereby the drive device can transmit forces to the transmission means and ultimately to the shuttle.

This clearance compensating support thus obtained makes it possible to assemble the closure device as a whole, including the support, without in as much losing the translation of the cover/plate as long as the closure device is not mounted on the structure (i.e. in a vehicle), the cover and the plate being in the free state (or pre-mounted state of the support). When the support is installed on the structure, this adjustment remains, thus making it possible to mount the drive device on the support and the support to the structure by compensating for any clearance. Once the drive device has been fixed, the cover and the plate are then passed into the locked state (or mounted state of the support), and can no longer translate. This locking thus makes good transmission of the forces from the drive device to the shuttle possible via the transmission means, making the closure device operational. The cover and the plate can thus be locked by mounting the drive device (e.g. the motor) when it is attached to the plate.

According to a particular feature of the invention, the translation between the cover and the plate makes it possible to adjust the position of the cover parallel to a direction defined by said transmission means, in said device.

The device may in fact comprise, on the plate, respectively the cover, means for receiving, holding and/or guiding the transmission means, upstream and/or downstream of the coupling area with the drive means. These receiving, holding and/or guiding means each define a reference axis, advantageously parallel to the translation axis. In particular, the translation axis may be parallel to the axis of the upstream reception, holding and/or guiding means. According to certain embodiments, the translation axis may form a small angle, for example less than 30°, with one of these reference axes.

According to a particular feature of the invention, said plate and said cover are connected by at least one retaining member formed on one of said parts and movable in an oblong hole arranged in the other of said parts, allowing said translation in said free state.

The retaining member keeps the support assembled, that is to say the cover and the plate are mounted on top of each other in their respective operating positions, modulo the compensation of the permitted clearance. More precisely, the plate and the cover are held close to each other by the retaining member, without thereby impairing the correct adjustment in translation by virtue of the oblong hole in which the retaining member is movable.

According to a particular feature of the invention, at least one of said retaining members is a clip engaging with the oblong hole so as to hold said parts connected together without preventing said translation in said free state.

The retaining member takes the form of a clip, which greatly simplifies the assembly of the cover and of the plate. It is thus sufficient to "clip" the cover onto the plate (or vice versa) to mount the support while allowing the cover/plate to move in translation. This clipping can be carried out after having mounted inside the support the elements relating to the transmission between the shuttle and the drive device (particularly the transmission means and any part used to couple it to the drive device).

According to a particular feature of the invention, said plate receives a gearwheel driving said transmission means and driven by the drive device, the axis of the gearwheel passing through an oblong hole formed in said cover so as to make said translation possible in said free state.

The gearwheel receives the output of the drive device (e.g. the shaft of a motor), while remaining movable in the adjustment direction within the support. Thus, this makes it possible to receive the drive device in translation and couple it to the transmission means while compensating for any clearance in the adjustment direction.

According to a particular feature of the invention, said plate carries at least two barrels projecting from the plate, each passing through an oblong hole formed in said cover so as to guide the cover in translation in relation to the plate in said free state.

The barrels, or fingers, make it possible not only to receive screws for fixing the motor to the plate, but also to guide the translation of the cover/plate by virtue of the engagement of each finger in the corresponding oblong hole. The guidance thus obtained improves the robustness of the support, but also the precision of the compensation of the clearance in the adjustment direction, since the guidance eliminates the displacement of the plate in relation to the cover (and vice versa) in the other directions.

The dual guiding and fixing function further makes it possible for the support to be more compact.

According to a particular feature of the invention, the transmission means comprises a cable housed in two sheath portions, the translation of said cover in relation to said plate modifying the distance between said sheath portions.

The cable thus housed in a rigid sheath can transmit very high forces, since the sheath ensures the good transmission thereof in the transmission direction.

According to a particular feature of the invention, at least one of said sheath portions has an end mounted on the cover, respectively on the plate, said end of the sheath portion terminating in a flared, trumpet-like portion locked in said cover, respectively said plate, and free in translation in relation to said plate, respectively to said cover, in said free state.

The flared portion (which may for example be in the form of a funnel or trumpet end, or form a ring, a protuberance or a bulge) for its part offers a simple assembly of the rigid sheath in the cover, without sacrificing the possibility of adjusting the plate in translation in relation to the cover. A second sheath portion is symmetrically mounted.

According to a particular feature of the invention, the plate and the cover are connected by a gripping portion arranged to lock the translation of the plate in relation to the cover in the locked state.

When the support is in the locked state, the gripping portion makes it possible to grip the translation. This gripping makes it possible for the drive device to transmit large forces to the transmission means, while allowing greater precision in the adjustment of the relative position between the cover and the plate in relation to what would be possible with a single fixed stop. The gripping portion is further simpler in design than an adjustable stop.

According to a particular feature of the invention, the passage from said free state to said locked state is obtained by applying a pressure to said cover against said plate in a direction orthogonal to the adjustment direction, so that the gripping portion causes said translation of the plate to grip in relation to the cover in the adjustment direction.

The passage to the locked state by application of this pressure makes it possible to grip the translation (therefore to fix the desired adjustment) as soon as the support is sandwiched between the structure and the drive device. Thus, in the case where the support is intended to be disposed between the structure and the drive device, gripping is necessarily obtained when the closure device is assembled. This dual assembly and gripping function thus reduces the number of steps in the process of assembling the closure device as a whole.

According to a particular feature of the invention, said pressure is applied by said screws.

The pressure obtained by the screws makes it possible to obtain a very high pressure, which improves the force of the gripping. This makes it possible to obtain this pressure during the assembly of the closure device to the structure, the assembly comprising screwing the drive device onto the support (or screwing the support to the structure).

According to a particular feature of the invention, said gripping portion comprises locking elements formed on the cover and on the plate, facing each other in the free state and engaging with each other in said locked state, so as to prevent said translation.

Obtaining gripping by shape complementarity makes it possible to obtain gripping capable of withstanding very high forces, while retaining great mechanical simplicity of the support and simple assembly.

According to a particular feature of the invention, the locking elements comprise at least one pair of sets of ridges extending substantially perpendicularly to said adjustment direction.

The ridges offer fine granularity in the choice of possible positions for gripping (compared to coarser shapes). The adjustment of the compensation of the plate/cover clearance is therefore more precise. The ridges also offer gripping capable of resisting high forces compared to gripping by friction between two flat surfaces.

According to a particular feature of the invention, the locking elements comprise at least one set of ridges formed on one of the parts of the support and the other part has a ductile surface, the ridges biting into the ductile surface in said locked state, so as to prevent said translation.

The ridges/ductile surface connection offers great precision in the positioning of the plate and the cover, without granularity. This further makes it possible to withstand high forces due to the bite of the ridges (acting as teeth) in the surface.

According to a particular feature of the invention, the locking elements comprise textured surfaces formed on the plate or the cover, the two textured surfaces engaging in said locked state, so as to prevent said translation.

The use of two textured surfaces offers great precision in the positioning of the plate and the cover. In addition, as gripping is obtained by simple friction, there is no material deformation during assembly when the cover is compressed against the plate, which allows the compensation of the cover/plate clearance to be modified if necessary.

The invention also relates to a motor vehicle comprising at least one closure device as described above.

Finally, the invention relates to a method for assembling this closure device described above, the method comprising the steps of:

- receiving a closure device the support of which is in the free state;
- securing the fixed part of the said closure device to the edges of said bay;
- securing the plate of the said support to the said structure;
- adjusting the position of said cover in relation to said support so that said drive means is suitably positioned in relation to said shuttle;
- locking said support, by passing from said free position to said locked position.

Thus, in the context of mounting the closure device, the free state corresponds to a pre-mounting state (i.e. the state in which the operator in charge of mounting receives the closure device) and the locked state corresponds to a mounted state, in which the closure device is operational.

4. LIST OF THE FIGURES

Figure 2:
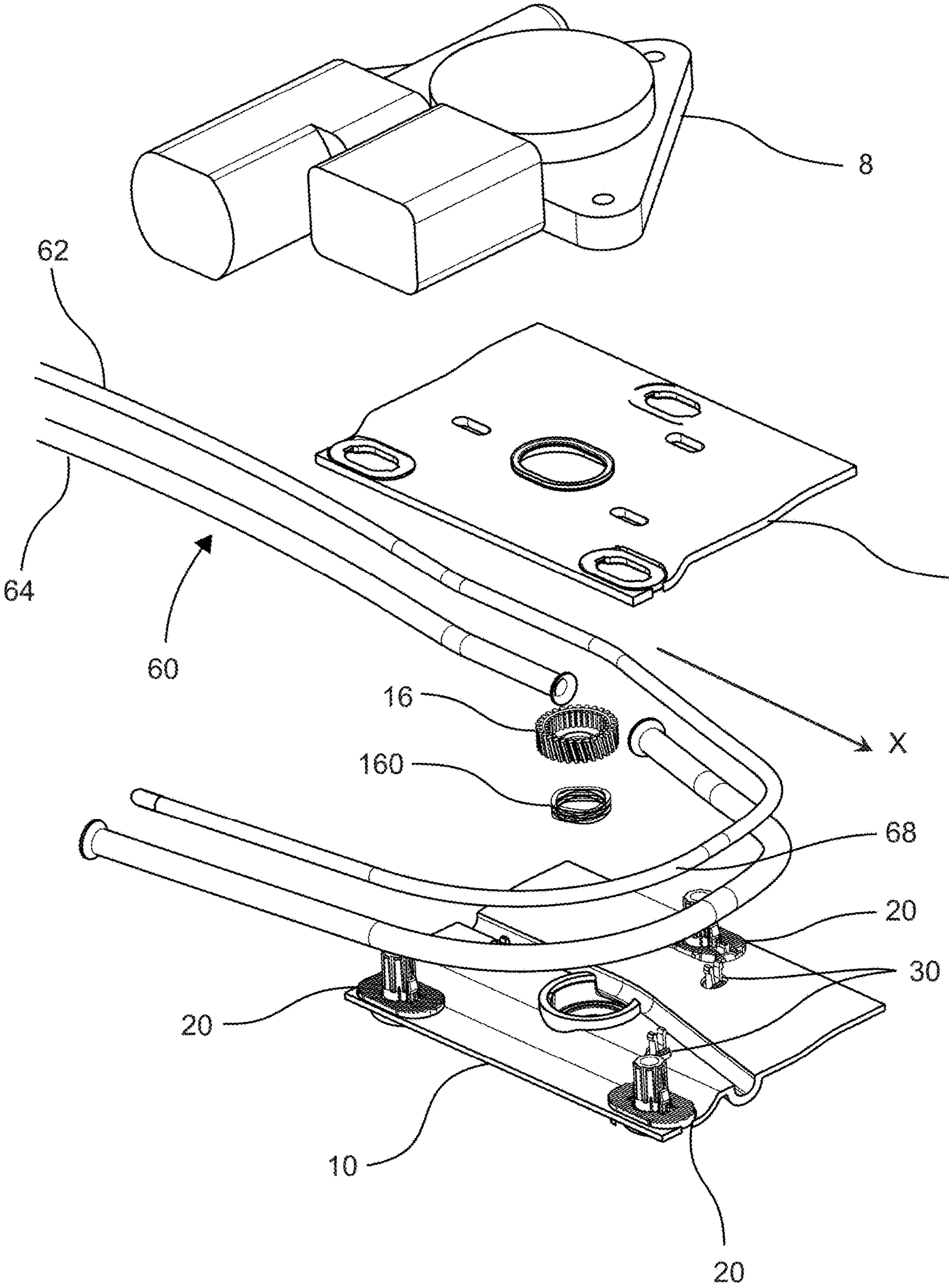
Figure 3:
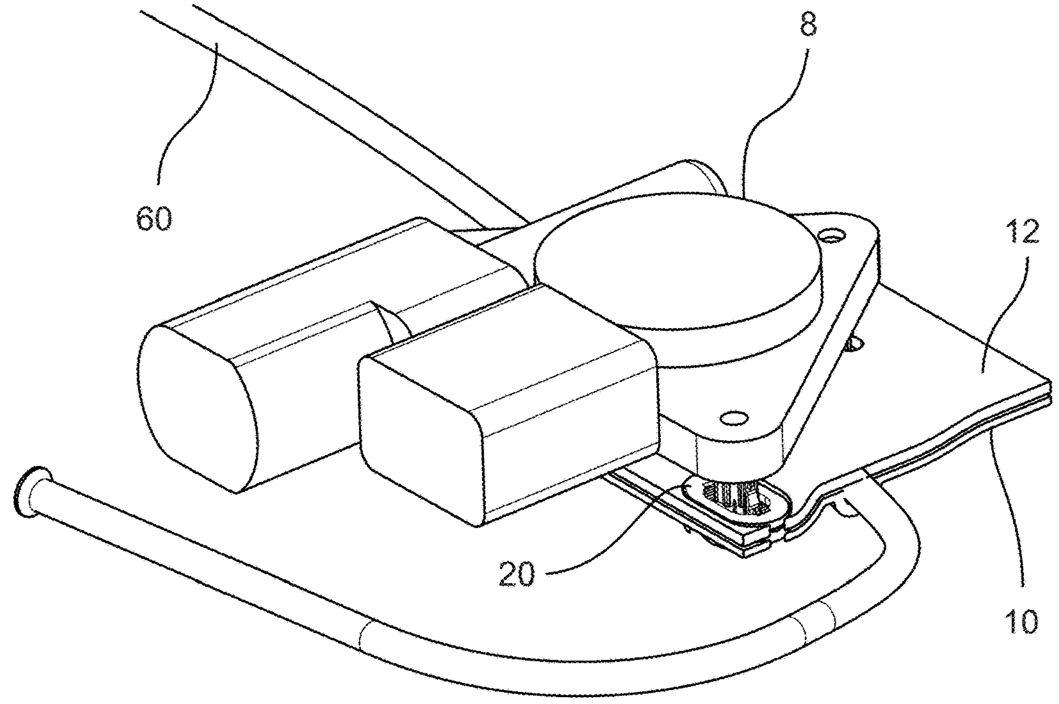
Figure 4:
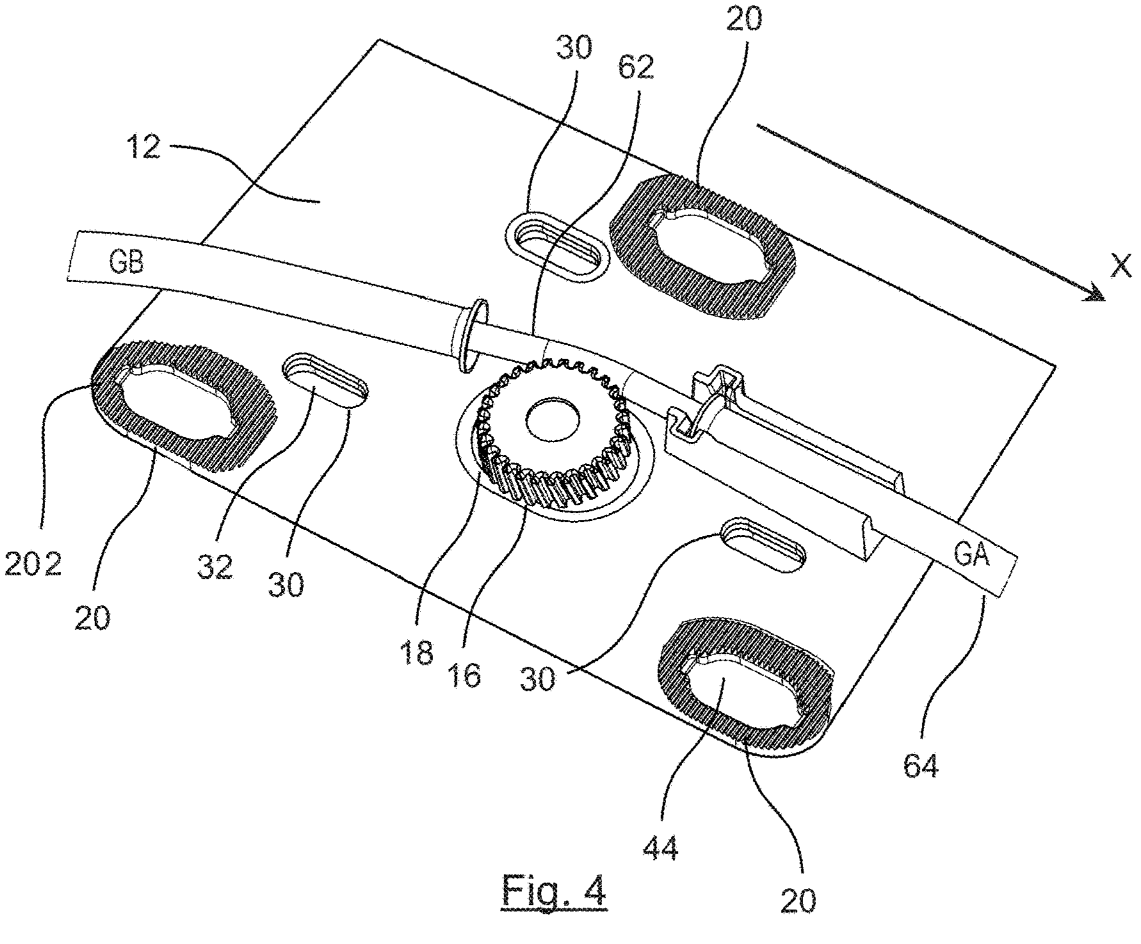
Figure 5:
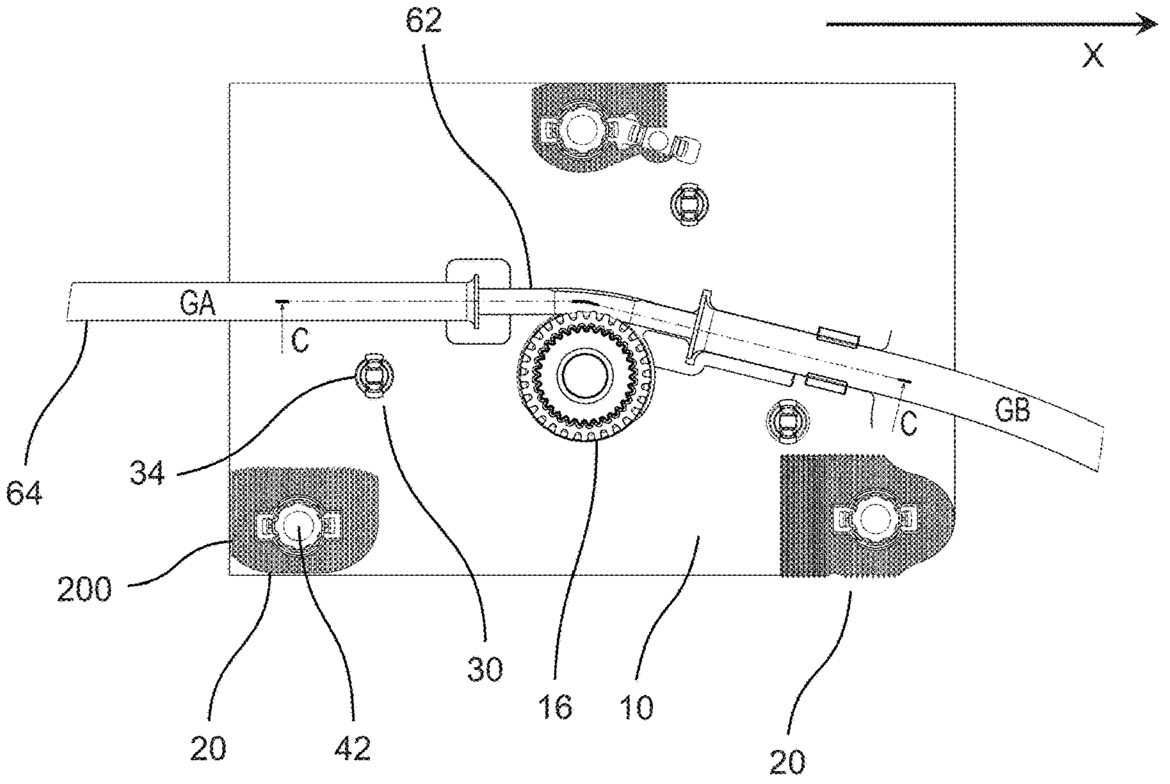
Figure 6:
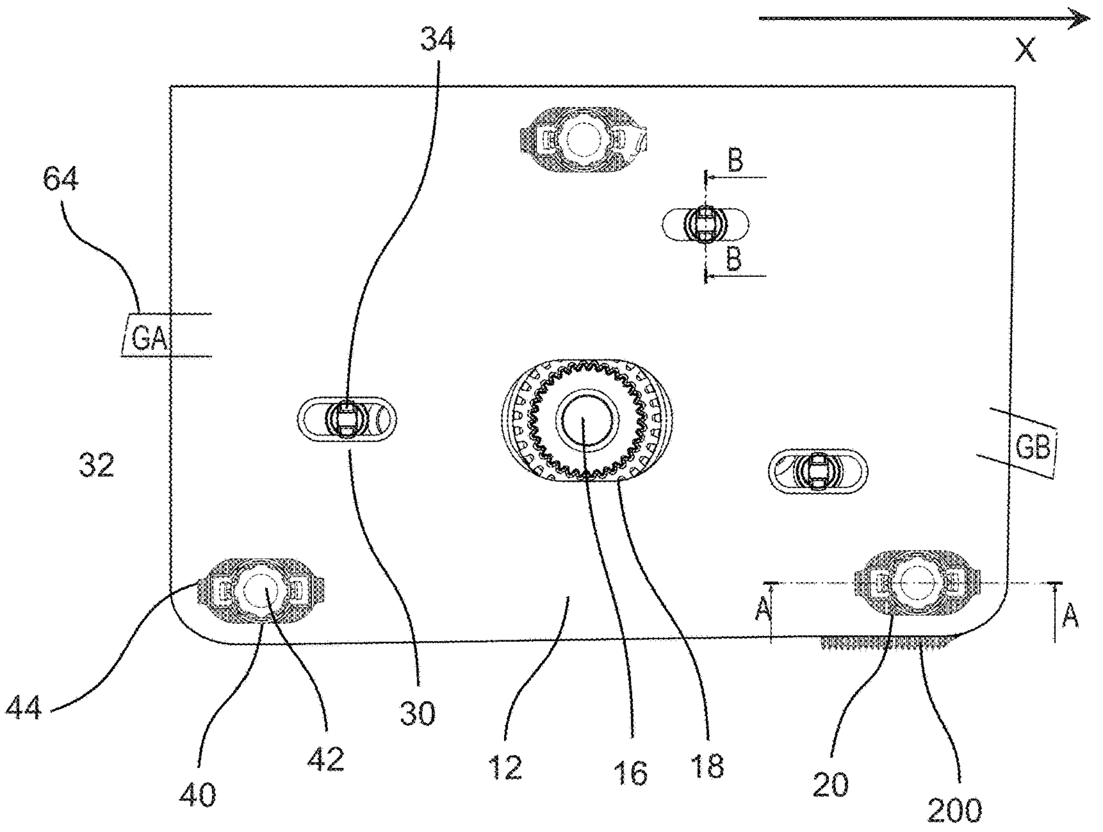
Figure 7:
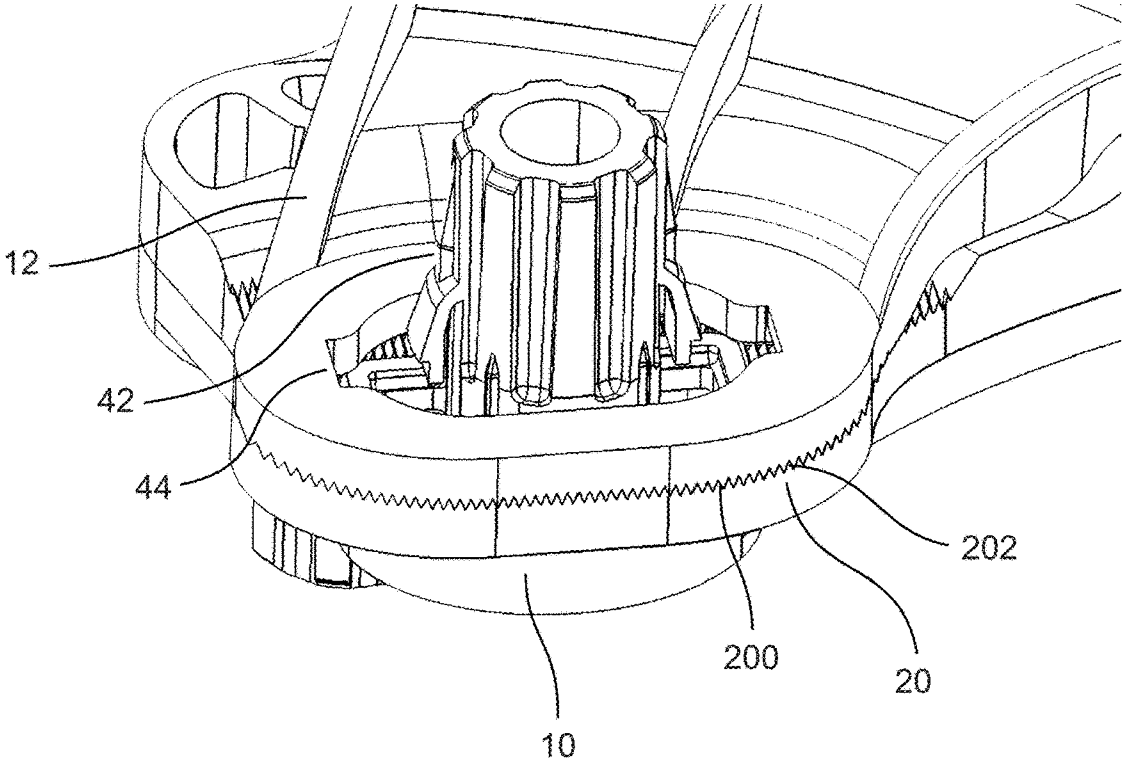
Figure 8:
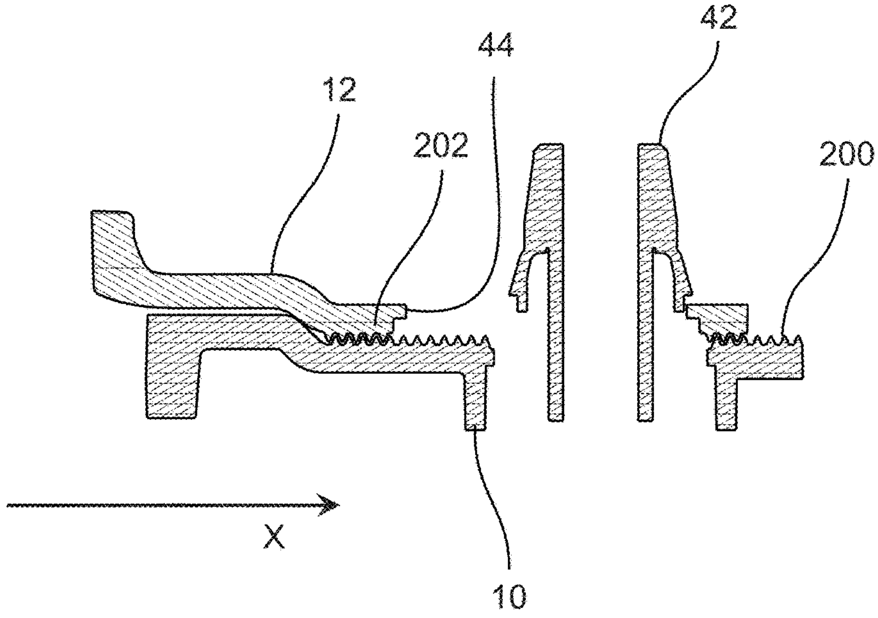
Figure 9:
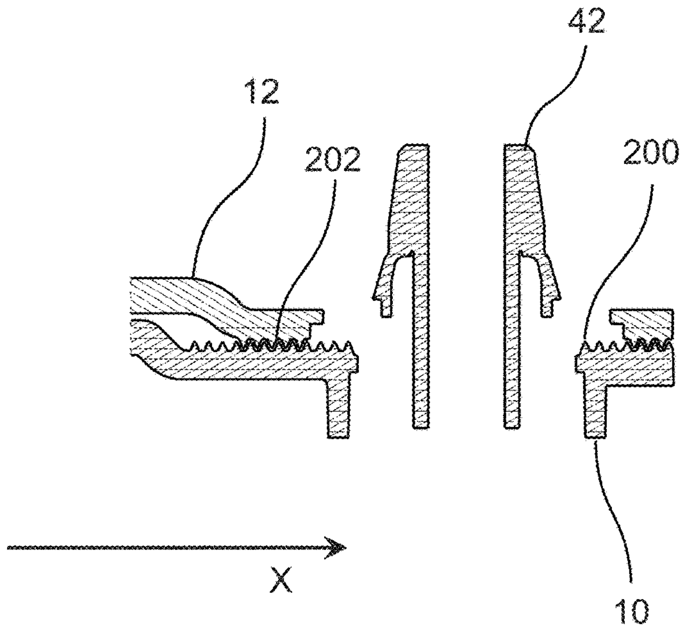
Figure 10:
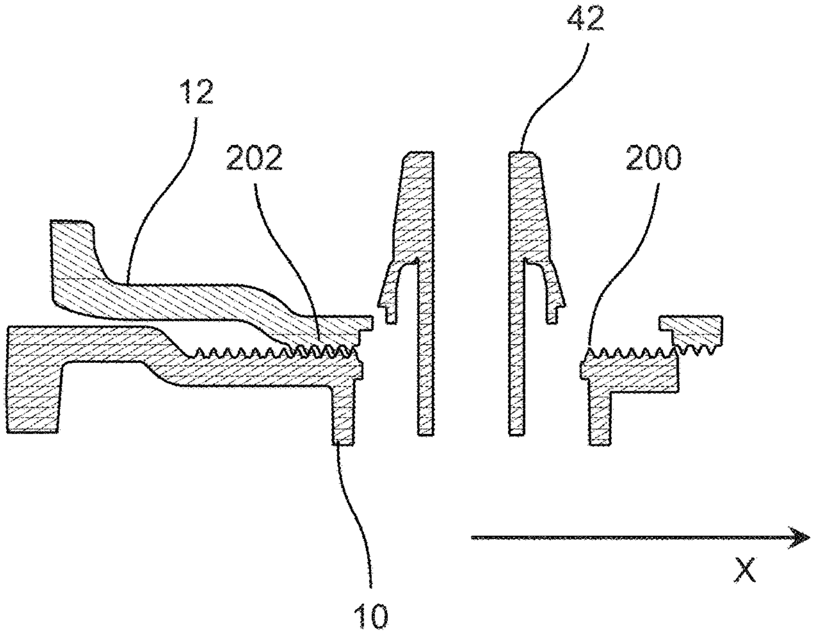
Figure 11:
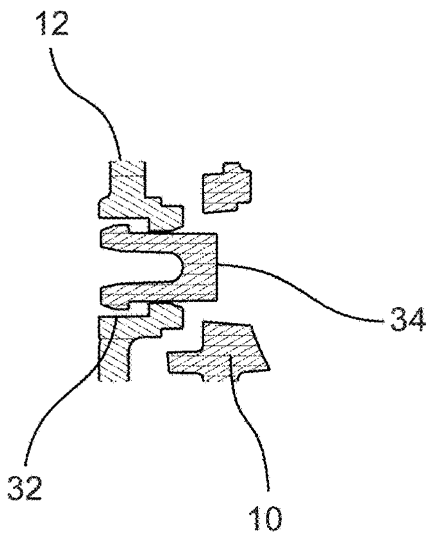
Figure 13:
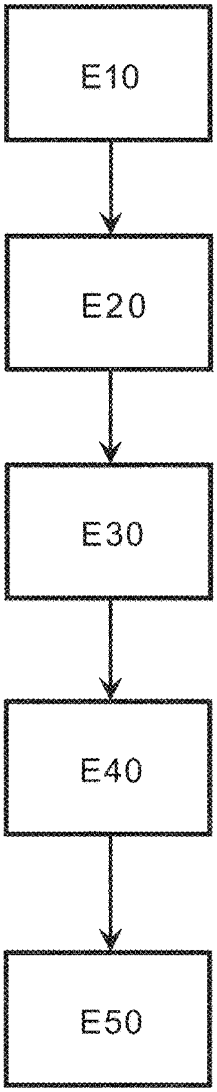
Figure 12:
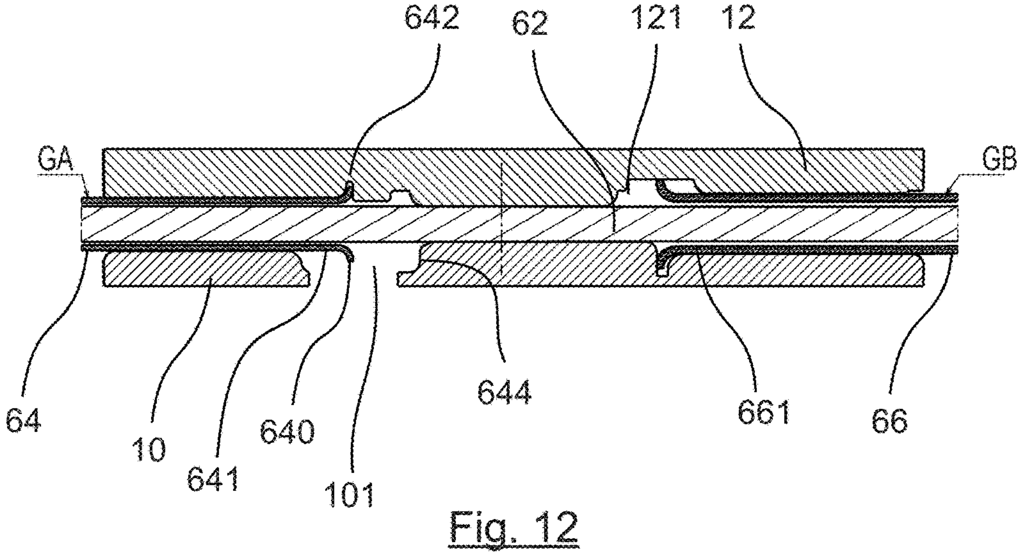
Figure 14:
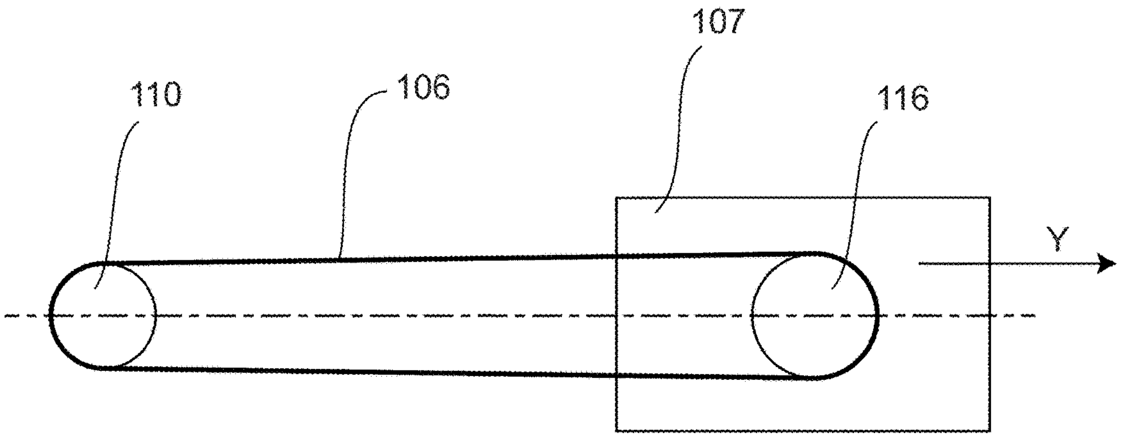
Figure 15:
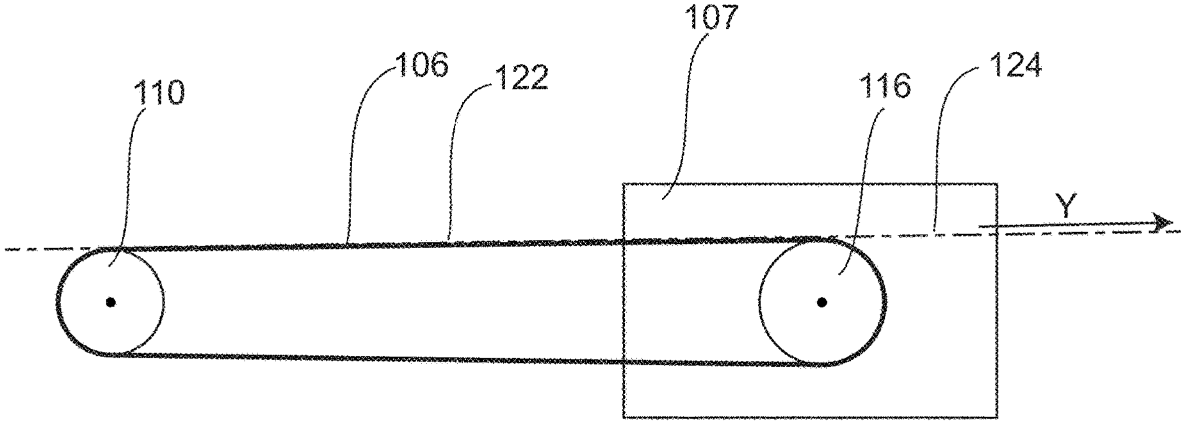

The proposed technique, as well as the different advantages thereof, will be understood more easily, in light of the following description of two illustrative and non-limiting embodiments thereof, and from the appended drawings wherein:

FIG. 1 shows a general view of one example of a closure device according to the invention, FIG. 2 shows an exploded view of an example of a support of the closure device of FIG. 1, FIG. 3 shows the mounted closure device in FIG. 2, FIG. 4 shows a perspective view from below of the support of FIG. 2, without a plate, FIG. 5 shows a top view of the support of FIG. 3, without a cover, FIG. 6 shows a top view of the support of FIG. 3, with a cover, FIG. 7 shows a perspective view of one example of gripping portion of the support of FIG. 6, FIG. 8 shows a sectional view of an example of a gripping portion of the support in FIG. 6 along the line A-A, the support being in a first configuration, FIG. 9 shows the detail of FIG. 8, the support being in a second configuration, FIG. 10 shows the detail of FIG. 8, the support being in a third configuration, FIG. 11 shows a sectional view of an example of a support retainer in FIG. 6, seen in a sectional view along the line B-B, and FIG. 12 shows a sectional view of the support of FIG. 5 according to the section C-C, FIG. 13 shows a simplified flowchart of a method for mounting the closure device of FIG. 1, FIG. 14 schematically shows the adjustment by the support for a belt drive, and FIG. 15 schematically shows a variant of FIG. 14.

5. DETAILED DESCRIPTION OF THE INVENTION

Subsequently, various embodiments of the proposed technique, treated merely as illustrative and non-limiting examples, are illustrated with reference to FIGS. 1 to 12.

5.1. General Principle

Reference is made to FIG. 1, which shows one example of a closure device 1 according to the invention. The closure device 1 is intended to close a bay arranged in a structure. The structure is typically the body or door of a vehicle.

The closure device 1 comprises a fixed part 2 wherein an opening is defined. The closure device 1 further comprises at least one movable sliding panel 3 guided along two guide rails 4 mounted on one face of said fixed part 2. The movable panel 3 is movable between a closed position, closing said opening, and at least one open position (partially or totally freeing the opening).

One of the rails 4 (here, the rail located at the bottom) guides in translation a shuttle 5 ensuring the passage of the movable panel 3 from said closed position to said at least one open position, and vice versa.

Said shuttle 5 is intended to be connected to a drive device (not shown in FIG. 1) offset in relation to said shuttle 5 and connected thereto by means of a transmission means 6. The drive device is coupled to the transmission means 6 by means of a support 7, at a coupling portion 60 of the transmission means 6.

Reference is now made to FIG. 2 and FIG. 3.

In the example described here, the transmission means 6 comprises a cable 62 housed in two rigid sheath portions 64, 66. The cable 62 is notched here, or provided with a serration (not shown in the figures), intended to engage with a gearwheel 16, in a coupling area between guide ends 641, 661 of said sheath portions 64 and 66.

The support 7 is intended to receive the drive device. The support 7 is further intended to be fixed to the structure of the vehicle.

As indicated above, the design of the closure device 1, as well as the assembly thereof on the structure of the vehicle, generates a certain number of clearances which, if not compensated for, may impair the proper operation, if not the integrity, of the parts of the mechanism of said closure device 1. The main sources of such clearance may be the bonding of the rail to the structure, the length of the transmission means 6 and/or the positioning of the support 7 on the structure.

In the embodiment described here, the drive device comprises an electric motor 8. The motor 8 may not be designed and assembled by the manufacturer of the closure device 1, but by a separate parts equipment manufacturer. In practice, this clearance can reach one centimetre, which leads to very substantial overstresses that impair the operation and/or durability of the closure device 1. These overstresses may further make it more difficult to fix the support 7 on the structure, since it is necessary to force it to achieve the assembly.

In order to overcome this problem, the support 7 comprises a first part 10, called a plate, and a second part 12, called a cover. The plate 10 is intended to be fixed to the structure and to receive the drive device. The cover receives a coupling portion 60 of the transmission means 6.

The plate and the cover are assembled (or secured) to one another so that they can assume a free state and a locked state.

The guide ends 641, 661 of the sheath portions 64 and 66 are received respectively by the plate 10 and the cover 12, using holding means 101, 121, capable of guiding the cable, in the coupling area, to engage with the gearwheel 16. The holding means are preferably formed so as to define an open angle, for example between 150 and 175°, to ensure a sufficient contact surface with the gearwheel.

In the free state, the plate 10 and the cover 12 are free in translation in relation to on another. This translation makes it possible to move the ends 641, 661 of the sheath portions away from one another or towards one another to ensure optimum positioning of the cable in relation to the gearwheel.

Translation is permitted along an adjustment axis X, preferably parallel to the axis of one of the holding means 101, 121, particularly the axis of the holding means 101 of the plate 10. Intermediate translation axes tangent to the gearwheel in the coupling area are possible.

The translation can take place along the transmission means 6 in one of the directions thereof when it is between the plate and the cover. Thus, the translation makes it possible to modify the position of the plate (and therefore of the gearwheel 16) longitudinally in relation to the cable.

In other words, this adjustment direction may be substantially parallel to a longitudinal direction defined by said transmission means, at the coupling area. In the example described here, the cable is slightly bent at the coupling portion once received in the cover. The longitudinal direction of the cable—that is to say, the direction of the tangent thereof in a point—varies slightly, and therefore remains substantially close to the adjustment direction, in the order of a few degrees. The angle of curvature of the cable can be higher without compromising the proper operation of the mechanism, the important thing being that the adjustment direction of the plate/cover translation makes it possible to adjust the position of the motor shaft, received in the plate, in relation to the transmission means housed in the cover, so as to compensate for mounting clearance and reduce internal stresses. Here, the plate 10 and the cover 12 are movable over a certain predetermined range of translation along this adjustment direction.

In the locked state, the plate and the cover are immobile in relation to one another. The manner in which the locking is achieved is described below.

Thus, the cover and the plate are adjustable in translation in relation to one another in the free state, and fixed in relation to one another in the locked state. In fact, any clearance in the adjustment direction can be compensated for by moving the cover and the plate into the free state. Once this clearance has been compensated, an operator responsible for fixing the closure device and the motor 8 to the structure tilts the support into the locked state, by which the motor 8 can transmit forces to the transmission means (here, to the cable 62 in the first sheath portion 64), and therefore to the shuttle 5.

This compensation of the clearance makes it possible to maintain the transmission means at the nominal length thereof and to mount the motor efficiently. This limits the prestresses within the motor/cable coupling mechanism (i.e. stresses when the mechanism is not working).

Since the support can be in the free state (particularly as long as it is not mounted on the structure), the clearance can be compensated for when the closure device 1 is assembled. This simplifies this assembly, since there is no need to force the motor 8 on the support 7 in order to mount it, but simply to adjust the relative position of the cover 12 and of the plate 10, then to lock them in translation.

The motor 8 and the structure sandwich the support 7 such that the support is interposed between the motor 8 and the structure. The motor 8 and the plate 10 sandwich the cover 12. Thus, when the motor 8 is fixed to the support 7, the motor 8 locks the plate 10 and the cover 12 in translation, thus securing the adjustment that these two parts confer by virtue of this clamping of the parts of the support 7.

The support 7 here houses a gearwheel 16 engaged with the cable 62. The gearwheel is disposed between the plate 10 and the cover 12. The gearwheel 16 is intended to receive the output shaft of the motor 8, by which the motor 8 is coupled to the transmission means 6. The shaft of the gearwheel 16 passes through an oblong hole 18 formed in said cover 12 so as to allow the cover 12 to move in translation in the free state.

The support 7 may comprise a spring 160 coaxial with the gearwheel 16. The spring makes it possible to press the gearwheel 16 against the cover 12 so as to hold said gearwheel 16 in position.

The plate 10 and the cover 12 are generally flat in shape, which allows the support 7 to be relatively thin, facilitating the installation thereof in a vehicle.

5.2. Gripping Portion

Reference is now further made to FIGS. 2 to 10.

The support 7 may comprise at least one gripping portion 20. Here, the support 7 comprises three gripping portions 20, disposed on the periphery of the support 7 (two at the corners of the support 7 and one at the middle of one side of the support 7).

Each gripping portion 20 comprises a first gripping part 200 formed on the plate 10 and a second gripping part 202 formed on the cover 12. The first gripping parts 200 are arranged on the plate 10 so that each of these first parts faces one of the second gripping parts 202 when the cover 12 is mounted on the plate 10.

The gripping portions 20 prevent the cover 12 from moving in translation in the adjustment direction X.

In the example described here, each of the gripping portions 20 comprises a pair of sets of ridges (a first set for the first gripping part 200 and a second set for the second gripping part 202). The first set and the second set are complementary in shape. The ridges of the sets of ridges are spaced apart from one another in the adjustment direction X. When the support 7 is in the locked state, the first set and the second set of each gripping portion 20 engage (as can be seen in FIGS. 8 to 10), thus locking the translation of the cover 12 in relation to the plate 10 (and vice versa).

When the cover 12 is pressed against the plate 10, for example using screws, the ridges engage with one another, which makes it possible to switch the cover/plate assembly into the locked state. When the cover 12 and the plate 10 are at a certain distance from one another (at least equal to twice the height of the ridges), the ridges no longer lock the translation of the cover/plate, and the support is in the free state.

These ridges effectively make it possible to resist large forces in the X direction. They further allow fine granularity in the positioning of the cover 12 and of the plate 10 in the X direction, as can be seen in FIGS. 8 to 10 that show the cover 12 and the plate 10 in various positions.

5.3. Retaining Member

Reference is also made to FIG. 11.

The support may include at least one retaining member 30. Here, the support 7 comprises as many retaining members 30 as there are gripping portions 20. Here, the retaining members 30 are identical.

The retaining member 30 retains the plate 10 close to the cover 12. The retaining member 30 further allows the plate 10 to move in translation in relation to the cover 12 in the adjustment direction.

Here, the retaining member 30 is formed by an oblong hole 32 and a clip-forming finger 34 engaged in the oblong hole 32 (when the support is assembled). The oblong hole 32 is elongated in the adjustment direction X. the oblong hole 32 can be formed in the cover 12 and the clip-forming finger 34 can project from the plate 10. As a variant, the oblong hole 32 may belong to the plate 10 and the clip-forming finger 34 may belong to the cover 12.

When the clip-forming finger 34 is engaged in the oblong hole 32, the clip-forming finger 34 is movable in translation in the oblong hole 32 in the direction X (due to the oblong shape in this direction X). The clip-forming portion of the clip-forming finger 34 abuts against the surface of the cover 12 furthest from the plate 10, so as to produce the desired retention.

The combination of several retaining members 30 as described above makes it possible not only to keep the cover 12 close to the plate 10, but also to allow a certain distance between the cover 12 and the plate 10, so that it is possible to cause them to move in translation. This makes it possible particularly to position the cover 12 and the plate 10 without the gripping portion 20 locking this positioning.

As a variant, the retaining member 30 may comprise two sets of projections, each set of projections comprising parallel projections distributed in the X direction, each projection forming a clip. The two sets of projections forming a clip are formed on the plate 10. The cover 12 has two flat and parallel rims, as spaced apart as the two sets of projections. Thus, when the support 7 is assembled, each set of projections engages with one of these edges, said projections then surrounding the two edges of the cover 12 in the manner of claws. This variant also retains the cover 12 in the vicinity of the plate 10, without thereby locking the translation in the X direction.

5.4. Guide Portion

The support 7 may comprise a guide portion 40, typically intended to act as a foolproofing device during the assembly of the support 7. The guide portion 40 is formed of a plurality of pairs each formed of a guide finger 42 and of an oblong hole 44. In the example described here, the fingers 42 project from the plate 10 and the oblong holes 44 are formed in the cover 12. The distribution of the fingers 42 on the plate 10 is similar to the distribution of the oblong holes 44 on the cover 12, so that when the cover 12 is assembled on the plate 10, each guide finger 42 passes through one of the oblong holes 44.

Each of the guide fingers 42 (or only certain ones) may comprise a threading intended to receive a screw serving to fix the motor 8 to the support 7. This makes it possible to gain compactness.

In the example described here, the gripping portions 20 are formed around the guide portions 40. More precisely, the first gripping part 200 and the second gripping part 202 are formed around one of the guide fingers 42 and around the corresponding oblong hole 44 thereof, respectively. Again, this saves space.

5.5. Alternatives to Ridges

In one variant, the gripping portion 20 comprises a set of ridges or teeth formed on the plate 10 (respectively on the cover 12), and a ductile surface formed on the cover 12 (respectively on the plate 10). In the locked state, the ridges or teeth bite into the ductile surface, so as to ensure the locking in translation of the cover and to be able to transmit forces from the motor 8 to the transmission means 6.

In another variant, the gripping portion 20 comprises textured surfaces formed on the plate 10 and the cover 12. The textured surfaces, when the cover 12 and the plate 10, provide sufficient friction to lock the translation of the cover 12 in relation to the plate 10, so as to be able to transmit forces from the motor 8 to the transmission means 6.

5.6. Implementation of the Transmission Means

Reference is made to FIG. 12. In the example described here, the end 641 of the sheath 64 terminates in a flared part 640. The flared end 640 is engaged with a groove 642 formed in the cover. The translation between the sheath 64 and the cover 12 is locked.

The plate 10 comprises a recess 644 facing the groove 642, but longer, so that the end 641 of the sheath, and in particular the flared part 640, can translate in relation to the plate 10 (in particular during adjustment).

The second sheath portion 66 houses the end portion 68 of the cable 62 that does not go towards the shuttle. The second sheath portion 66 so as to improve the translational guidance of the cable 62 under the action of the motor. The second sheath portion 66 here also terminates in a flared portion 661 locked in translation in the plate 10 and movable in translation in relation to the cover 12, in a manner similar to the flared portion of the first sheath portion 64 (but with the role of the plate 10 and the cover 12 reversed).

The second sheath portion 66 thus houses and guides the end portion 68 of the cable 62 at the outlet of the plate. This makes it possible particularly to prevent this end portion 68 from being loose in the support 7.

Since the ends 641 and 661 are locked, or fixed, in relation to the cover, respectively in relation to the plate, and are movable in the corresponding recess of the plate, respectively of the cover, the translational movement of the cover in relation to the plate in the adjustment direction X makes it possible to vary the distance between the two ends 641 and 661.

The second sheath portion 66 may be optional, depending on the embodiments. In the absence of a second sheath portion 66, the end of the cable 62 can be left free, or guided using an alternative means such as a ring.

As seen above, the adjustment direction may be substantially parallel to a longitudinal direction defined by said transmission means at the coupling portion. The plate (receiving the gearwheel) may in particular be movable in translation in relation to the cover (receiving the cable) along the cable 62. This makes it possible to adjust the position of the gearwheel along the cable, so as to be able to fine-tune the tension of the transmission means, as has been seen previously.

The plate is here arranged so as to bend the cable 62 at the gearwheel 16. The length of contact between the gearwheel 16 and the cable 62 is thereby increased, as are the number of teeth engaged. Transmissible forces are more important. However, this does not prevent the proper operation of the adjustment mechanism, as seen above.

It should be noted that the cable can here be notched (which does not appear in the figures), the notches of the cable engaging with the teeth of the gearwheel 16 to ensure more reliable transmission with greater forces.

A transmission means formed by a cable housed in a sheath has been described. As a variant, two examples of which are schematically illustrated in FIGS. 14 and 15, the transmission means may be a belt 106 driven by the motor via a pulley (toothed or not) 116. Since the belt needs to be tensioned between this pulley 116 and another pulley 110 on the side of the movable panel of the flush bay (not shown), compensation of the clearance by the support 107 finds full advantage thereof in this case too. In the schematic example of FIG. 14, the plate and the cover of the support 107 are movable in an adjustment direction Y substantially parallel to a longitudinal direction of the belt once tensioned, that is to say a straight line 120 passing through the centre of rotation of the two pulleys 110 and 116. Alternatively, shown schematically in FIG. 15, the adjustment direction Y is substantially parallel to the longitudinal direction 122 of one of the portions 120 (or strand) of the belt 106, preferably the portion 120 that is most tensioned (i.e. in tension). These two cases can be summarised more generally due to the fact that the adjustment direction is substantially parallel to a longitudinal direction defined by the transmission means. This longitudinal direction can then correspond to the straight line 120 connecting the two pulleys, to a longitudinal direction of a strand of the belt, or any other length having an influence on the tension state of the belt.

It is possible to envisage a transmission belt system with three or more pulleys, the support making a translational adjustment possible in a direction substantially parallel to one of the strands leaving the pulley at the output of the motor, ideally (but not necessarily) the most tensioned strand. The transmission means may also be a cable of the bicycle brake cable type, not shown.

5.7 Mounting the Support

Reference is made to FIG. 13, which shows a simplified flowchart of a method for mounting the closure device.

This method comprises the following steps of:

receiving E10 a closure device the support of which is in the free state;

securing E20 the fixed part of the said closure device to the edges of said bay;

securing E30 the plate of said support to said structure;

adjusting E40 the position of said cover in relation to said plate so that said drive means is suitably placed in relation to said shuttle, corresponding to a position for correct installation of the motor;

locking E50 said support 7, by passing from said free position to said locked position.

The motor 8 is fixed to the plate 10 during the locking E50. More precisely, fixing the motor 8 to the plate 10 by screwing causes the support 7 to be locked E50. This ensures, among other things, that the support 7 is adjusted in a manner that generates the least prestress as possible while ensuring a good transmission of the forces, since it is the motor 8 which, during installation, locks the cover 12 in relation to the plate 10.

The invention claimed is:

1. A closure device for closing a bay arranged in a structure, the closure device comprising a fixed part, wherein an opening is defined, and at least one movable panel guided sliding along two guide rails mounted on one face of said fixed part, between a closed position, closing said opening, and at least one open position, at least one of said guide rails guiding in translation a shuttle ensuring the passage of the movable panel from said closed position to said at least one open position, and vice versa, said shuttle being configured to be connected to a drive device offset in relation to said shuttle and connected to said shuttle by means of a cable moving within at least a first sheath portion so as to form a transmission means, one part of said cable being engaged with a gearwheel of said drive device, wherein the closure device comprises a support configured to receive said drive device, the support being configured to be fixed to said structure and comprising two parts:

a first part formed as a plate, configured to be fixed to said structure and to receive said drive device, and a second part formed as a cover, secured to said first sheath portion of said transmission means, the cover being mounted on the plate so that the support is capable of taking at least two states:

a free state, wherein the cover and the plate are free in translation in relation to one another, said translation between the cover and the plate moving said gearwheel along the cable, inducing a variation of a tension of the cable;

a locked state, wherein the cover and the plate are immobile in relation to one another.

2. The closure device according to claim 1, wherein the translation between the cover and the plate makes it possible to adjust the position of the cover parallel to a direction defined by said transmission means, in said device.

3. The closure device according to claim 1, wherein said plate and said cover are connected by at least one retaining member formed on one of said two parts and movable in an oblong hole arranged in the other of said two parts, allowing said translation in said free state.

4. The closure device according to claim 3, wherein at least one of said retaining members is a clip engaging with the oblong hole so as to hold said two parts connected together without preventing said translation in said free state.

5. The closure device according to claim 1, wherein said plate receives a gearwheel driving said transmission means and driven by the drive device, the axis of the gearwheel passing through an oblong hole formed in said cover so as to make said translation possible in said free state.

6. The closure device according to claim 1, wherein said plate carries at least two fingers projecting from the plate, each passing through an oblong hole formed in said cover so as to guide the cover in translation in relation to the plate in said free state.

7. The closure device according to claim 1, wherein the transmission means comprises second sheath portions, the translation of said cover in relation to said plate modifying the distance between said sheath portions.

8. The closure device according to claim 7, wherein at least one of said sheath portions has an end mounted on the cover or respectively on the plate, said end of the sheath portion terminating in a flared, trumpet-like portion locked in said cover, respectively said plate, and free in translation in relation to said plate, respectively to said cover, in said free state.

9. The closure device according to claim 1, wherein the plate and the cover are connected by a gripping portion arranged to lock the translation of the plate in relation to the cover in the locked state.

10. The closure device according to claim 9, wherein the passage from said free state to said locked state is obtained by applying a pressure to said cover against said plate in a direction orthogonal to the adjustment direction, so that the gripping portion causes said translation of the plate to grip in relation to the cover in the adjustment direction.

11. The closure device according to claim 10, wherein said pressure is applied by screws.

12. The closure device according to claim 9, wherein said gripping portion comprises locking members formed on the cover and on the plate, facing one another in the free state and engaging with one another in said locked state, so as to prevent said translation.

13. The closure device according to claim 12, wherein the locking members comprise at least one pair of set of ridges extending substantially perpendicular to said adjustment direction.

14. The closure device according to claim 13, wherein the locking members comprise at least one set of ridges formed on one of the parts of the support and the other part has a ductile surface, the ridges biting into the ductile surface in said locked state, so as to prevent said translation.

15. The closure device according to claim 12, wherein the locking elements comprise textured surfaces, formed on the plate or the cover, the two textured surfaces engaging in said locked state, so as to prevent said translation.

16. A Motor vehicle comprising at least one closure device for closing a bay arranged in a structure, the closure device comprising a fixed part, wherein an opening is defined, and at least one movable panel guided sliding along two guide rails mounted on one face of said fixed part, between a closed position, closing said opening, and at least one open position, at least one of said guide rails guiding in translation a shuttle ensuring the passage of the movable panel from said closed position to said at least one open position, and vice versa, said shuttle being configured to be connected to a drive device offset in relation to said shuttle and connected to said shuttle by means of cable moving within at least a first sheath portion so as to form a transmission means, one part of said cable being engaged with a gearwheel of said drive device, wherein the closure device comprises a support configured to receive said drive device, the support being configured to be fixed to said structure and comprising two parts:

a first part formed as a plate, configured to be fixed to said structure and to receive said drive device, and a second part formed as a cover, secured to said first sheath portion of said transmission means, the cover being mounted on the plate so that the support is capable of taking at least two states:

a free state, wherein the cover and the plate are free in translation in relation to one another, said translation between the cover and the plate moving said gearwheel along the cable, inducing a variation of a tension of the cable;

a locked state, wherein the cover and the plate are immobile in relation to one another.

17. A Method for assembling a closure device comprising the steps of:

receiving a closure device the support of which is in the free state;

securing the fixed part of the said closure device to the edges of said bay;

securing the plate of the said support to the said structure;

adjusting the position of said cover in relation to said support so that said drive means is suitably positioned in relation to said shuttle; and locking said support, by passing from said free position to said locked position.

* * * * *